United States Patent [19]

McGregor

[11] Patent Number: 4,824,135
[45] Date of Patent: Apr. 25, 1989

[54] AUTOMATIC SELF-STEERING TRAILER AXLE

[76] Inventor: Donald T. McGregor, 8067 Monroe Ave., Stanton, Calif. 90680

[21] Appl. No.: 928,512

[22] Filed: Nov. 10, 1986

[51] Int. Cl.[4] ............................................. B62D 13/00
[52] U.S. Cl. .................................... 280/442; 280/400; 280/443
[58] Field of Search ............... 280/442, 443, 444, 426, 280/411 R, 419, 426, 400

[56] References Cited

U.S. PATENT DOCUMENTS

| | | |
|---|---|---|
| 1,213,440 | 1/1917 | Weppelo . |
| 1,361,090 | 12/1920 | O'Keefe . |
| 1,524,136 | 1/1925 | Kapferer et al. . |
| 1,671,774 | 5/1928 | McIntosh . |
| 1,712,063 | 5/1929 | Agramonte . |
| 1,811,798 | 6/1931 | Lucke . |
| 1,915,325 | 6/1933 | Linn . |
| 1,968,046 | 7/1934 | Linn . |
| 2,123,559 | 7/1938 | Bedard ................................ 280/444 |
| 2,127,868 | 8/1938 | Huffman . |
| 2,258,678 | 10/1941 | Elwood . |
| 2,345,945 | 4/1944 | Miner ................................ 280/442 X |
| 2,359,978 | 10/1944 | Edwards . |
| 2,377,641 | 6/1945 | Miner ................................ 280/442 X |
| 2,389,752 | 11/1945 | Avery . |
| 2,533,553 | 12/1950 | Burns . |
| 2,644,697 | 7/1953 | Peterson ........................ 280/442 X |
| 2,674,463 | 4/1954 | Peterson ........................ 280/442 X |
| 2,674,464 | 4/1954 | Peterson . |
| 2,712,945 | 7/1955 | Peterson . |
| 2,764,424 | 9/1956 | Standing . |
| 2,929,642 | 3/1960 | Dinkel et al. ...................... 280/443 |
| 3,212,793 | 10/1965 | Pietrordia ......................... 280/443 |
| 3,447,813 | 6/1969 | Wolf . |
| 3,662,848 | 5/1972 | Magnusson . |
| 3,876,240 | 4/1975 | Watson . |
| 3,883,151 | 5/1975 | Barchus . |
| 4,171,825 | 10/1979 | Woodell . |
| 4,305,602 | 12/1981 | Ungvari et al. . |
| 4,405,147 | 9/1983 | Horsman et al. .................. 280/442 |
| 4,451,058 | 5/1984 | Curry ................................ 280/443 |
| 4,494,272 | 1/1985 | Morita . |
| 4,512,593 | 4/1985 | Ehrhardt . |

FOREIGN PATENT DOCUMENTS 439545  9/1948  Italy ................................... 280/442

Primary Examiner—James T. McCall
Attorney, Agent, or Firm—Lyon & Lyon

[57] ABSTRACT

An automatic self-steering trailer axle wherein the wheel spindles are pivotally mounted upon the steering knuckle plate and may be pivoted in front of or behind the kingpin by means of a ratchet wheel which is engaged or disengaged by changing the direction of movement of the axle. The invention also includes a control linkage assembly which may be connected to the trailer axle and also connected to the trailer hitch or towing vehicle steering so that a change in direction of the towing vehicle while it is being operated in a rearward direction is transmitted directly to the control linkage.

25 Claims, 10 Drawing Sheets

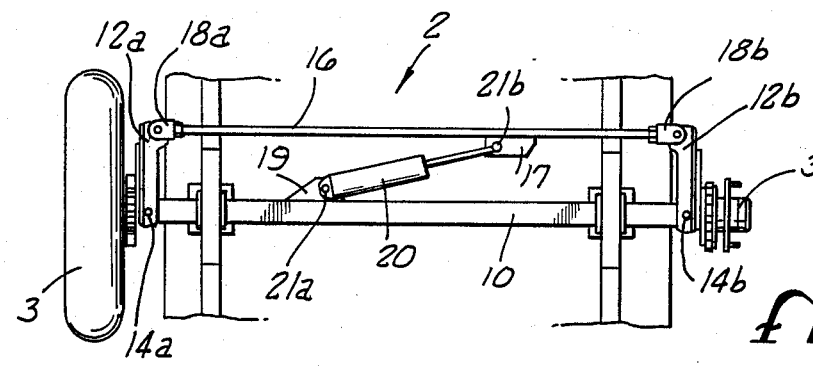
fig.4.
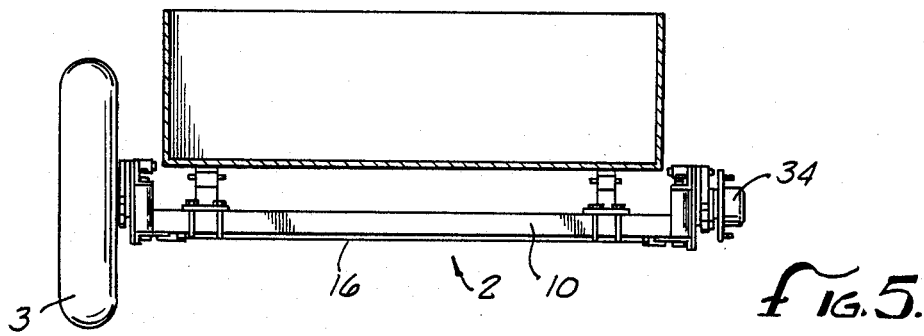
fig.5.
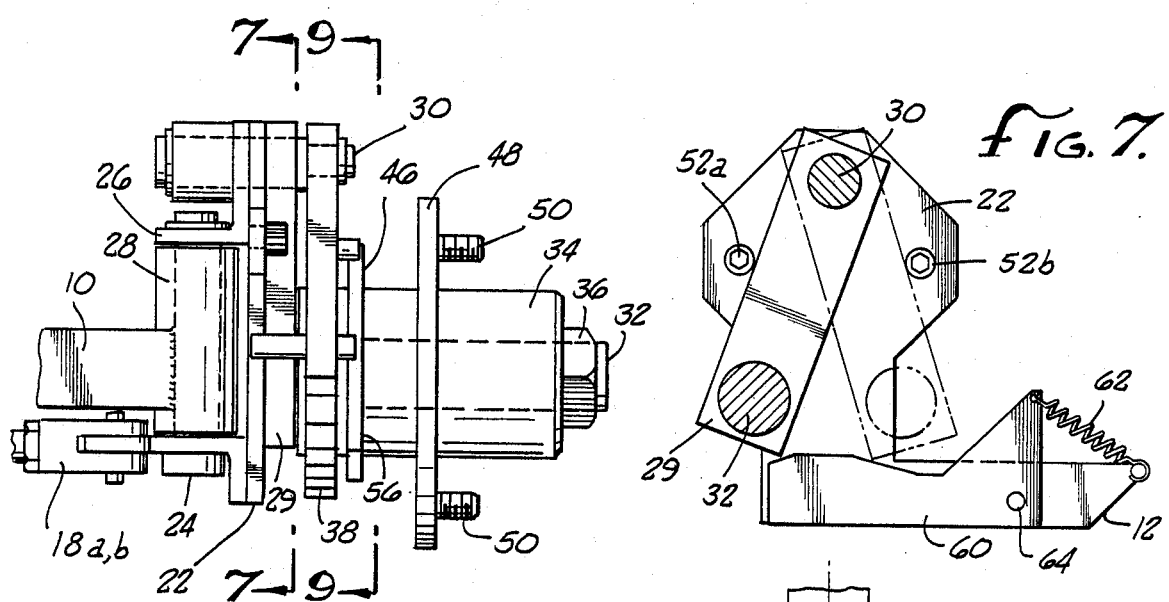
fig.6.
fig.7.
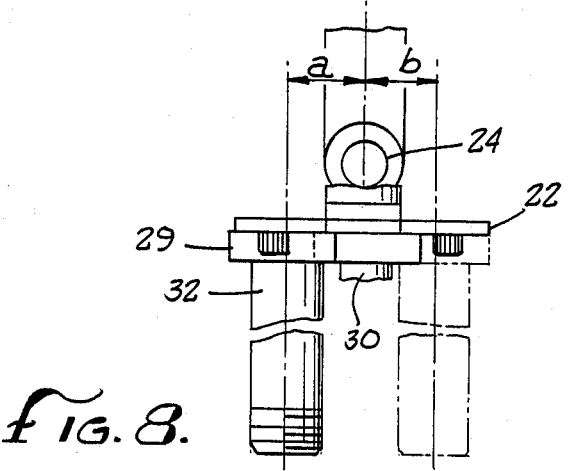
fig.8.

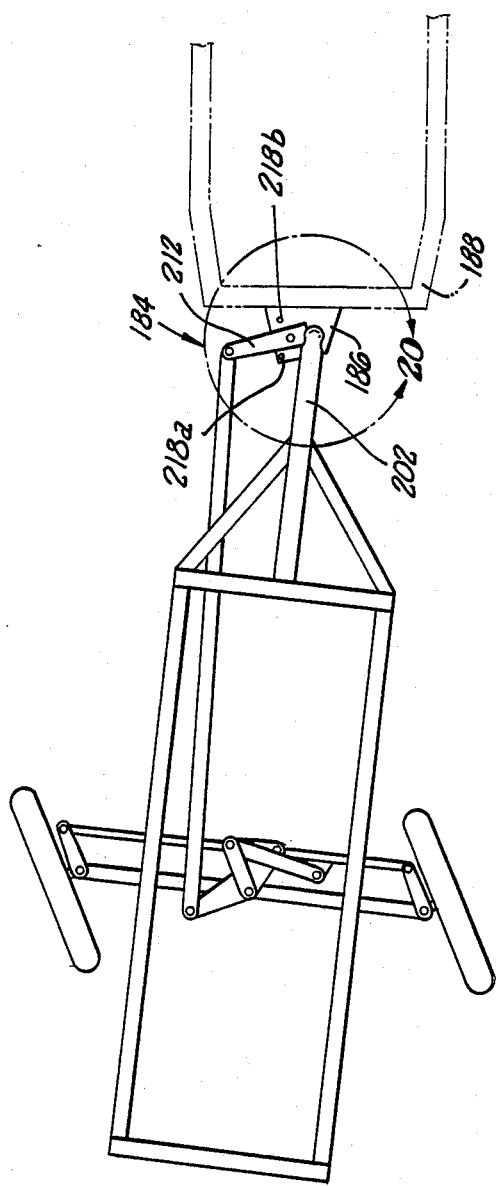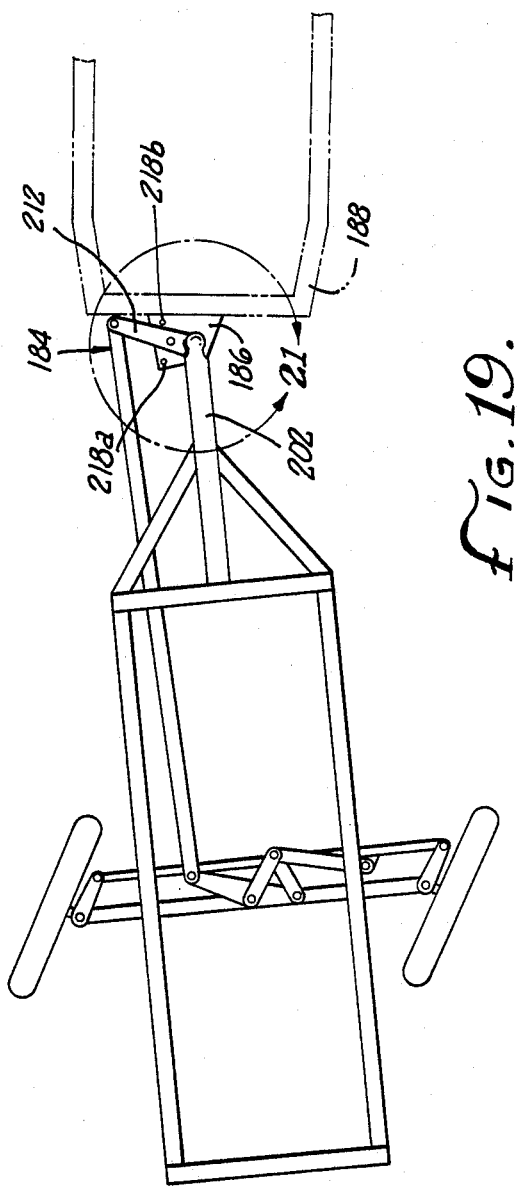

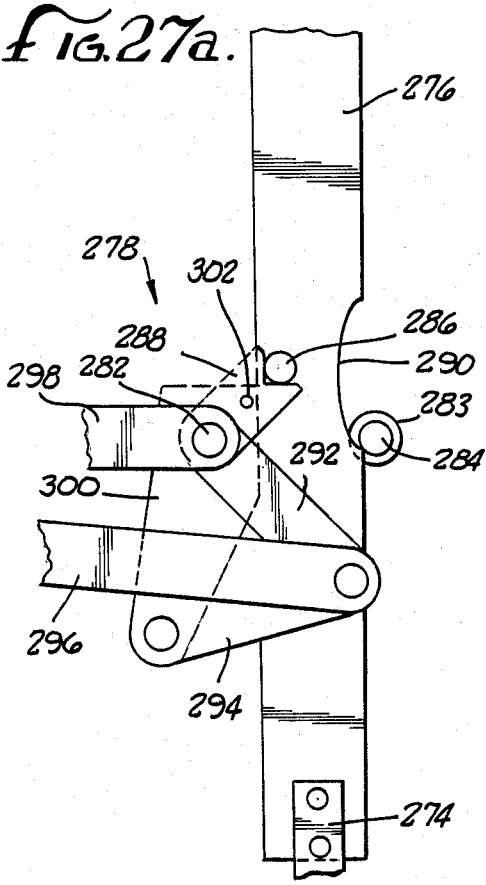
FIG.27a.
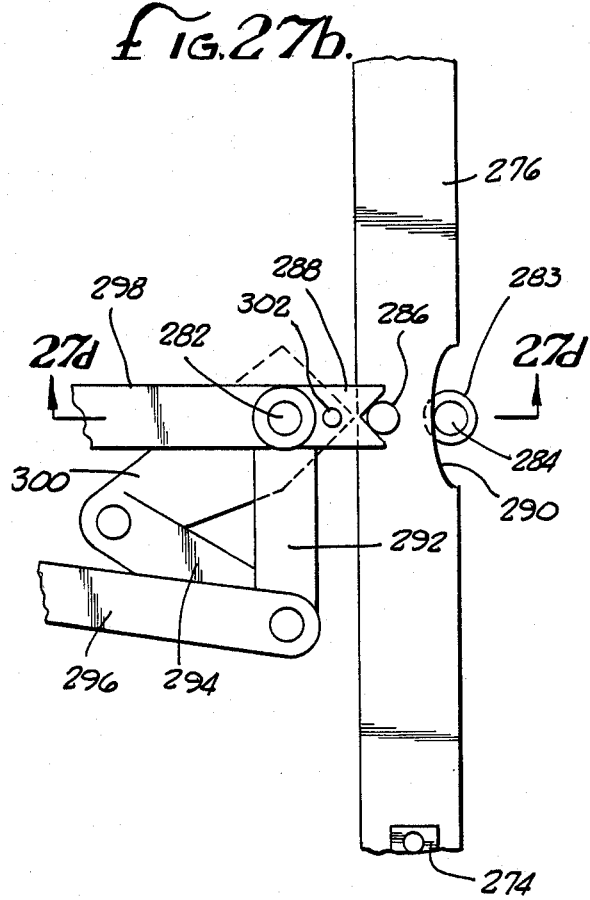
FIG.27b.
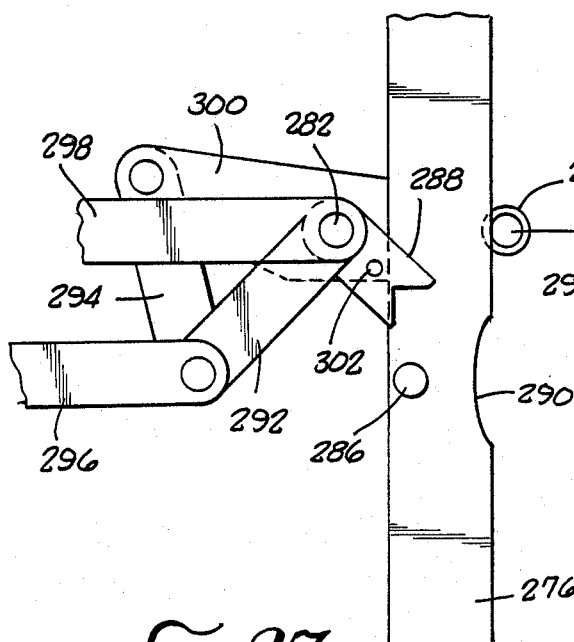
FIG.27c.
FIG.27d.

AUTOMATIC SELF-STEERING TRAILER AXLE

FIELD OF THE INVENTION

This invention relates to the field of axles for trailers and other towable vehicles and, more particularly, to automatic self steering axles for trailers.

BACKGROUND OF THE INVENTION

It has long been known that a problem exists with regard to the backing up of a trailer or other type of towable vehicle. This problem exists with regard to two-wheeled single axle trailers, as well as four-wheeled double axle trailers. The average driver not familiar with or experienced in the handling of trailers has a great deal of trouble in controlling the directional movements of the trailer, while attempting to back up his or her vehicle and trailer.

In order to insure that the standard trailer properly follows or tracks the towing vehicle, the spindles upon which the wheel hubs rotate are normally positioned behind the kingpins. This configuration provides for better tracking of the trailer through turns when moving in a forward direction. This same configuration, however, is known to inhibit the ability of the trailer to be easily and properly directed during the backing up or rearward movement of the vehicle.

Various prior art devices have attempted to solve this problem by providing for a shifting of the placement or castering of the spindle, from behind the kingpin during forward movement to a position in front of the kingpin during rearward or reverse movement of the vehicle. These devices have traditionally relied upon a friction mechanism to momentarily lock the wheel while the shifting or transfer of the axle caster took place. Examples of such types of devices are described in Morita, U.S. Pat. No. 4,494,272, Barchus, U.S. Pat. No. 3,883,151 and Linn, U.S. Pat. No. 1,915,325. These devices all suffer from a lack of preciseness in their automatic shifting action. These devices utilize a moving component which is frictionally engaged within the wheel assembly to momentarily lock the wheel in place allowing for a pivoting of the spindle about the kingpin. The locking ability of such devices depends, in part, upon the suddenness or force of the initial rearward movement of the trailer and the condition of the components. Due to the wear of the components resulting from the frictional locking movement, as the components age the locking capabilities of the mechanism change over time.

Prior devices, such as those just described, have primarily been utilized on two-wheeled or single-axle trailers. Such devices have not generally proven satisfactory for use on four-wheeled or double-axle trailers. Up to this point, a satisfactory means for enhancing the control of a double-axled trailer during backing-up has not existed. Various devices have been developed to improve the steerability of double-axled trailers so that they will more properly follow the towing vehicle through turns while being pulled forward. An example of such a device is shown in Watson, U.S. Pat. No. 3,876,240. This type of device, however, does not provide for the improved handling of the double-axled trailer when the trailer is being backed up.

A need, therefore, exists for an improved automatic self-steering axle for trailers and other towable vehicles to improve the ability of the vehicle to be controlled while being backed up or otherwise moved in a rearward direction.

SUMMARY OF THE INVENTION

This invention comprises a wheel assembly in which the spindles upon which the wheel hub rotates are pivotally mounted about the kingpins. A ratchet plate having a plurality of teeth arranged circumferentially about the plate is mounted on the spindle and rotates with the wheel hub. A double-armed pawl is pivotally mounted above the plate and is held in a neutral position above the rotating ratchet plate by means a friction yoke.

Upon a change of direction of the rotation of the spindle, the friction yolk is moved from its neutral position so as to allow one end of the pawl to pivot and engage the teeth of the rotating ratchet plate, thereby locking the plate in a stationary position With the plate locked, horizontal movement of the spindle causes the wheel assembly to pivot about the kingpin. When the wheel assembly has pivoted about the kingpin, the friction yolk again engages the pawl and holds it in a neutral position. The double-armed pawl enables the wheel assembly to be pivoted about the kingpin whenever the vehicle changes direction. This allows for the spindle to always be positioned behind the kingpin during movement of the vehicle, which positioning provides for better tracking and control of trailers and other towable vehicles.

The subject invention is also used as part of a steering control for trailers and other towable vehicles. On double-axle or four-wheel trailers, the rear axle is provided with trailer steering linkage connected to the steering linkage of the towing vehicle. The steering linkage is activated or neutralized by rotation of an actuator plate, activated by a ratchet wheel and pawl assembly, about the wheel hub.

Therefore, it is an object of this invention to provide an automatic self-steering axle for trailers which is automatically activated by a change in the direction of the movement of the trailer from forward to reverse and vice-versa.

It is also an object of this invention to provide a steering axle which is disconnected from the towing vehicle's steering linkage when moving in a forward direction and automatically connected to the steering linkage when moved in reverse.

These and other objects will be readily apparent from the detailed description which follows.

DETAILED DESCRIPTION OF DRAWINGS

FIG. 4 shows a top view of the automatic castering axle assembly.

FIG. 5 shows a front view of FIG. 4.

FIG. 6 shows a side view of the wheel assembly.

FIG. 7 shows a partial front view of the wheel assembly, with the spindle located in the reverse position.

FIG. 8 shows a top view of FIG. 7.

FIG. 18 shows a steering axle trailer with a booster arm hitch mechanism in a left-turn position.

FIG. 19 shows a steering axle trailer with a booster arm hitch mechanism in a right-turn position.

FIG. 27a–d illustrates an alternate embodiment of the steering axle linkage.

DETAILED DESCRIPTION

Figure 1:
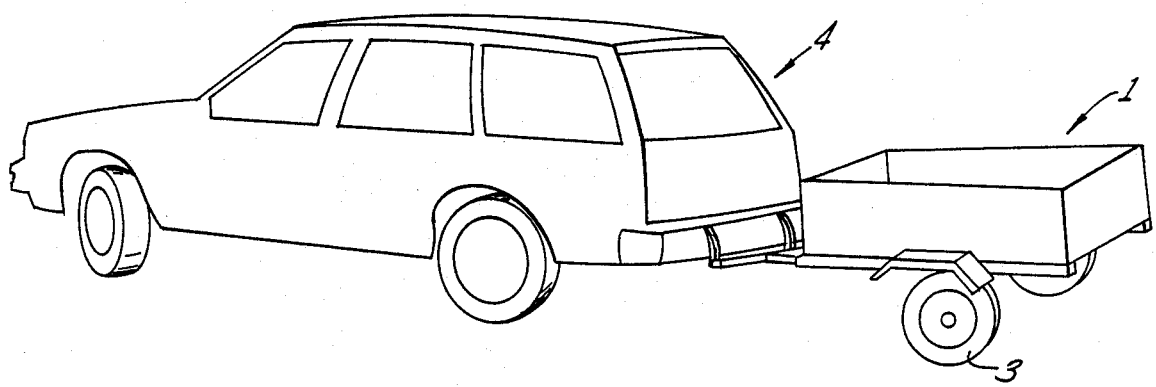
FIG. 1 shows a typical single-axle trailer connected to a towing vehicle by means of a two-point connection system.

One embodiment of the subject invention is shown in FIGS. 1–9c. The automatic self-steering axle is mounted on a single-axle trailer 1 as shown in FIG. 1. The axle assembly 2 is shown in FIGS. 4 and 5. As shown in FIG. 4, the axle 10 is a standard straight axle. The axle assembly 2 is a standard steering axle assembly in which steering arms 12a and 12b are pivotally connected to the respective ends of axle 10 as shown in FIG. 4 by means of kingpins 14a and 14b. Steering arms 12a and 12b are connected by means of tie rod 16 and tie rods 18a and 18b. Tie rod ends 18a and 18b are pivotally connected to the ends of steering arms 12a and 12b, respectively, with tie rod 16 being threaded into the end of tie rod ends 18a and 18b. These components are standard steering axle components and are known in the industry.

Figure 2:
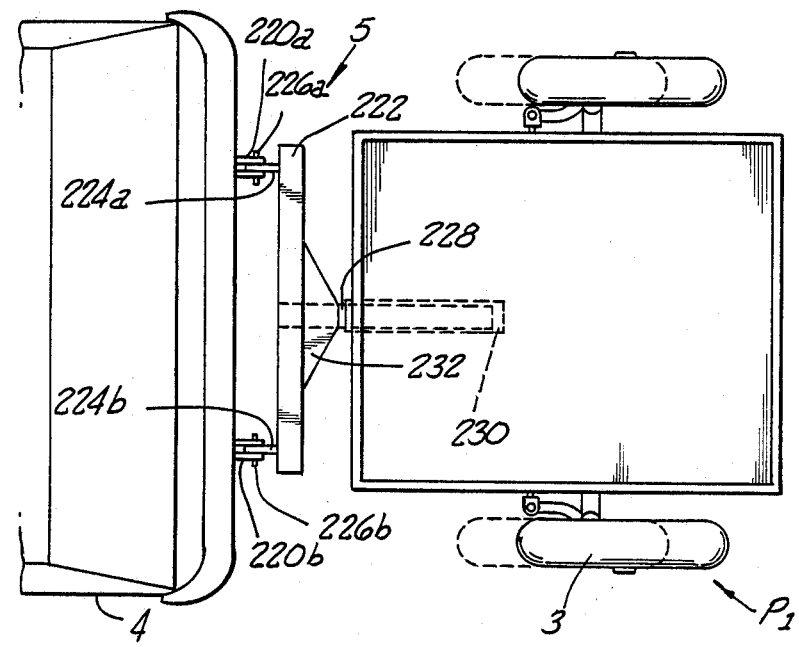
FIG. 2 shows a top view of a single-axle trailer with the automatic castering axle in the forward movement position.

A damper 20 is mounted between the axle 10 and tie rod 16 as shown in FIG. 4. The damper 20 may be any suitable damping means readily available, in the preferred embodiment, said damper consists of a standard hydraulic cylinder connected at its respective ends to tie rod flange 17 and axle flange 19 by means of bolts 21a and 21b. The tie rod and steering arm assembly is mounted forward of the axle 10 as shown in FIGS. 2 and 4.

The automatic castering components of the axle assembly are shown in FIGS. 6–9c. Referring to FIG. 6, a standard steering knuckle plate 22 is connected to the ends of the axle 10 by means of a kingpin 24. The kingpin 24 is inserted through an aperture in the knuckle plate flange 26 and axle end 28 as shown in FIG. 6. As with the standard operation, the knuckle plate 22 pivots about the kingpin 24 during the turning of the wheel. A spindle crank 29 is pivotally mounted on knuckle plate 22 by means of a spindle crank pivot pin 30 centered above the kingpin 24. The mounting of the spindle crank 29 is shown in FIG. 7.

Figure 9A:
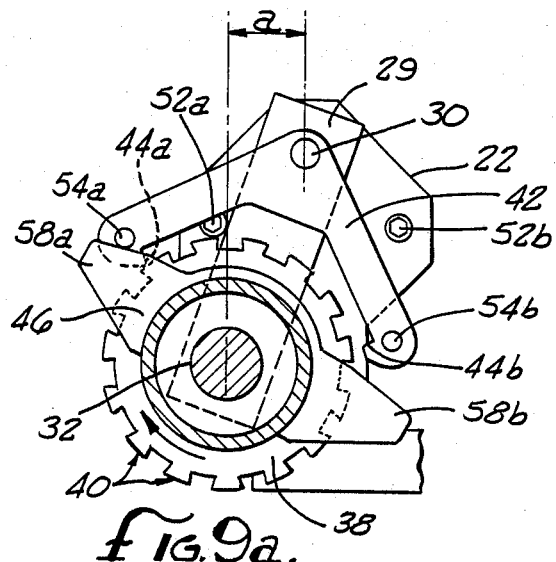
FIG. 9a shows the wheel ratchet assembly in the forward position.
Figure 9B:
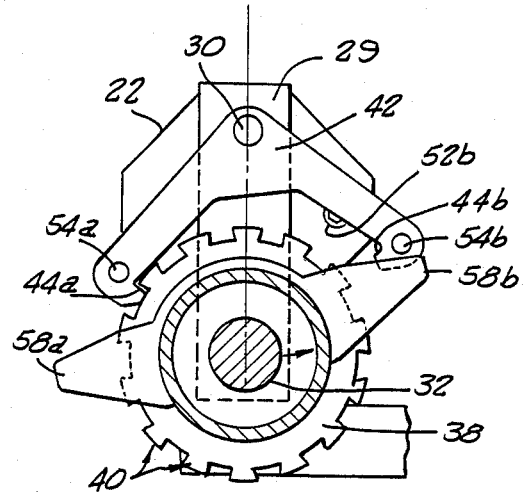
FIG. 9b shows the wheel ratchet assembly in a transitional position between forward and reverse.

The spindle 32 is mounted on the lower end of the spindle crank 29 as shown in FIG. 7, as opposed to the normal wheel assembly in which the spindle 32 is mounted directly on the knuckle plate 22. The wheel hub 34 is mounted on the spindle 29 and held in place by means of a locking nut 36. A ratchet ring 38 is mounted on the wheel hub 34 as shown in FIGS. 6 and 9. A plurality of ratchet teeth 40 are uniformly arranged about the circumference of the ratchet ring as shown in FIGS. 9a and 9b. A double-armed ratchet pawl 42 is pivotally mounted on spindle crank pivot pin 30, with the ratchet pawl 42 being co-planar with the ratchet ring 38 as shown in FIG. 6. Pawl teeth 44a, 44b are located at the ends of the double-armed ratchet pawl 42 as shown in FIG. 9.

A friction yoke 46 is also mounted on the wheel hub 34 as shown in FIGS. 6, 9a, 9b and 9c. Finally, a lug nut plate 48 is located on wheel hub 34 as show in FIG. 6, said lug nut plate 48 having a plurality of lug nuts 50 extending perpendicularly therefrom as shown in FIG. 6.

Figure 9C:
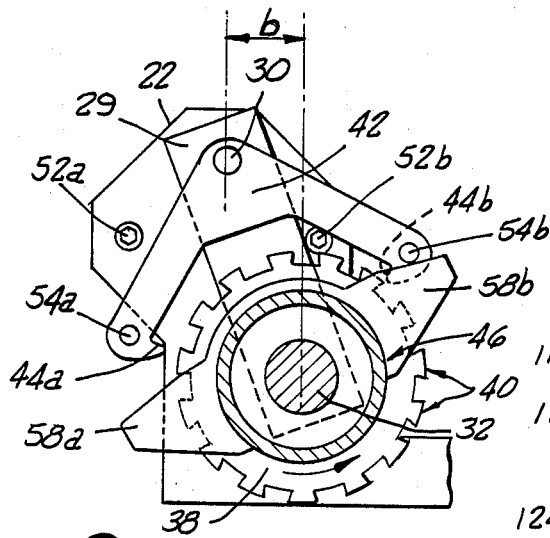
FIG. 9c shows the wheel ratchet assembly in the reverse position.

The operation of the castering components is illustrated in FIGS. 9a, 9b and 9c.

Figure 3:
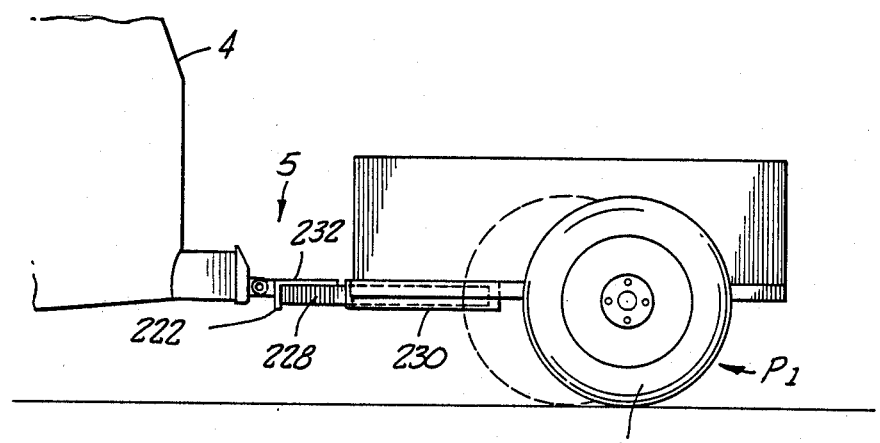
FIG. 3 shows a side view of FIG. 2.

FIG. 9a shows the positioning of the wheel assembly when the trailer is moving in a forward direction with the wheel hub 34 rotating in a clockwise direction. In this position, the spindle 32 is located to the rear or behind of the spindle crank pivot pin 30 and kingpin 24. The spindle crank 29 has rotated about the crank pin 30 to the rear to the position shown in FIG. 9a. The rotation or pivoting of the spindle crank 29 is limited by the spindle stop 52a. With the spindle 32 located in this position, the wheels will follow the turning of the towing vehicle while the vehicle is moving in a forward direction, allowing for a proper following and self-steering action. The positioning of the wheels of the trailer when the spindle is in this position is shown in FIGS. 2 and 3. As shown, the wheel 3 is positioned rearward of the kingpin 24 in position $P_1$. As shown in FIG. 9a, the friction yoke 46, which is mounted on the hub, engages pawl stop 54a, thereby holding the double-armed ratchet pawl 42 in a position in which the pawl teeth 44a, 44b do not engage the ratchet teeth 40 while the wheel hub 34 is rotating. This prevents wear and tear of the pawl teeth 44 and ratchet teeth 40 during movement of the vehicle.

The friction yoke 46 is fitted within a channel 56 on the wheel hub 34. The friction coefficient between the friction yoke 46 and the wheel hub 34 is such that, upon commencement of rotation, the friction yoke will rotate with the wheel hub 34 until such time as the friction yoke arm 58a or 58b comes in contact with the respective pawl stop 54a or 54b, at which point the coefficient of friction is overcome, with the wheel hub 34 continuing to rotate while the friction yoke 46 remains stationary with an arm 58a or 58b in contact with pawl stop 54a or 54b holding the double-armed pawl 42 in position above the ratchet ring 38. When the direction of the trailer is changed, the spindle 32 is caused to automatically pivot to a position on the opposite side of the spindle crank pivot pin 30 and kingpin 24 alignment, as shown in FIGS. 9b and 9c.

Upon movement of the trailer in the reverse direction, the wheel hub 34 will begin rotation in a counterclockwise direction, which will cause the friction yoke 46 to rotate with the wheel hub 34. During this rotation, the friction yoke arm 58a, 58b will rotate away from respective pawl stop 54a, 54b, allowing the pawl 42 to pivot or swing about spindle crank pivot pin 30 such that the pawl tooth 44a will engage the ratchet teeth 40 as shown in FIG. 9b. Upon engagement of the pawl tooth and ratchet ring, the rotation or movement of the wheel hub 34 will be momentarily locked, during which time period the continued movement of the trailer caused by the continuing movement of the towing vehicle will cause the spindle crank 29 to pivot about spindle crank pivot pin 30 until the spindle crank 29 contacts the spindle stop 52b.

During the shifting procedure, the rotation of the spindle crank 29 causes the ratchet ring 38 to disengage the pawl tooth 44. Further, upon the rotation of the spindle crank 29 and accompanying wheel hub 34, the friction yoke arm 58b is brought into contact with the pawl stop 54b, thereby holding the pawl 42 in a position in which the pawl teeth 44a, 44b are not in engagement with the teeth 40 of ratchet ring 38. In this position, the wheel hub 34 is now free to rotate in a counterclockwise, or reverse direction, thereby following the movement of the trailer unit. The operation of the wheel assembly is repeated in reverse order when the movement of the trailer is changed from reverse to forward.

In order to prevent the spindle crank 29 from pivoting from its position behind the kingpin 24 during movement of the vehicle in a situation in which the wheel would lose contact with the ground, such as in the event the trailer encountered a bump or other road obstacle, a locking arm 60 is pivotally mounted on the steering arm 12 as shown in FIG. 7. The locking arm 60 is retained in place by biasing means, such as a coil spring 62, also shown in FIG. 7. The locking arm 60 pivots about a pivot pin 64, which allows for the downward pivoting movement of the locking arm 60 during the transfer process. Upon completion of the transfer process, the locking arm 60 is returned to its normal locking position by means of a spring 62.

Figure 24:
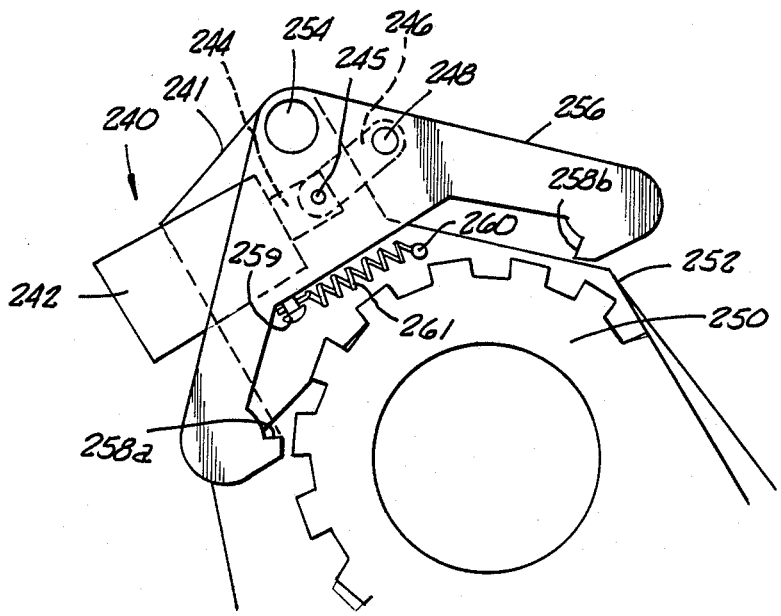
FIG. 24 shows an alternate embodiment of the wheel ratchet assembly.
Figure 25:
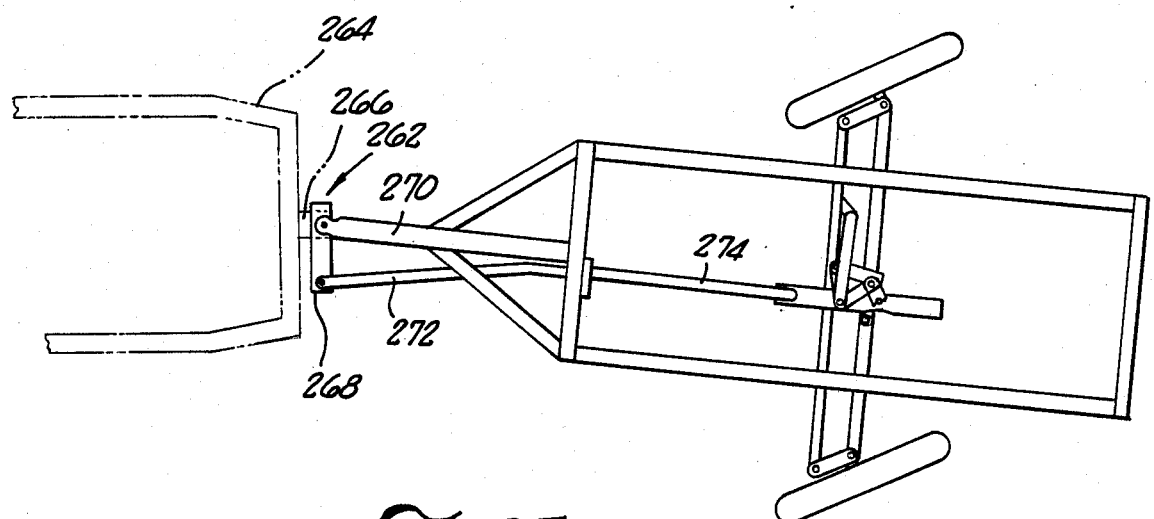
FIG. 25 shows an alternate embodiment of the actuating mechanism.
Figure 26:
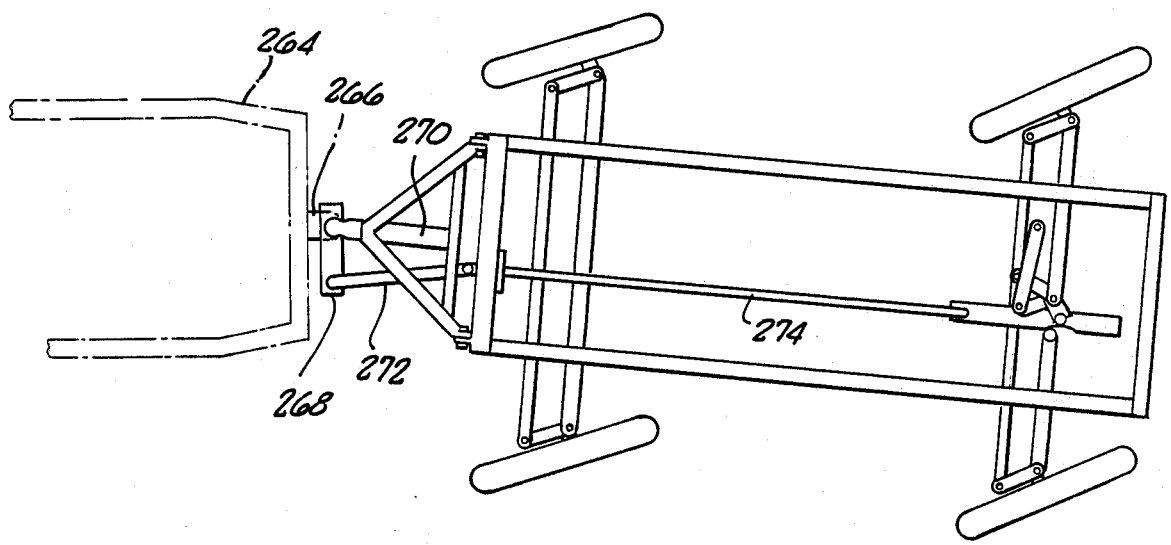
FIG. 26 shows the actuating mechanism on a double-axle mechanism.

In an alternate embodiment of the wheel ratchet assembly, the friction yoke 46 is replaced with a solenoid actuating arm assembly 240 as illustrated in FIG. 24. The solenoid 242 is mounted such that it rotates with spindle crank 241. The solenoid arm 242 is connected to the double-armed pawl 256 by means of connecting arm 256. Arm 256 is connected to the double-armed pawl 256 by means of pin 248 and to the solenoid arm 244 by means of pin 245.

The solenoid actuating arm assembly 240 can be actuated either by an actuation switch located in the vehicle itself or by direct connection with the vehicle's back-up light circuit. The actuation circuit is not shown. In operation the wheel ratchet assembly operates in the same manner as described with respect to FIGS. 9a-e. Upon actuation of the solenoid the solenoid arm 244 will draw inward thereby causing the pawl 256 to pivot about pivot crank pin 254 such that pawl tooth 258b engages ratchet teeth 252 located on ratchet ring 250. This prevents rotation of the wheel and causes the spindle crank 241 to pivot about pin 254.

Once the spindle crank has pivoted the pawl tooth 58b disengages the teeth 252 and the wheel is free to rotate. Biasing spring 261 is connected on one end to the spindle crank by pin 260 and on its other end to the double-armed pawl 256 by pin 259. The biasing spring stabilizes the double-armed pawl 256. Upon placing the vehicle in a forward gear the solenoid circuit releases the arm 244 and the spring 261 acts to return the double-armed pawl 252 to a forward position so that pawl tooth 258a engages ratchet teeth 252 until such time as the spindle crank 241 pivots about pin 254.

The relationship of the spindle 32 to the kingpin 24 during movement of the trailer is shown more clearly in FIG. 8. When the trailer is moving in a forward direction, the spindle 32 is located a distance "a" behind the kingpin 24. Upon reversing the direction of the trailer, the spindle 32 is pivoted to the position shown by the dotted lines, an equal distance "b" behind the kingpin 24. The position of the wheels 3 with respect to the kingpin 24 is shown in FIGS. 2 and 3 as dashed-line position P$_2$.

In the embodiment just described, the automatic castering mechanism is utilized in connection with a self-steering axle. In this embodiment, the wheels of the trailer turn to follow the turning movement of the towing vehicle in much the same manner as a standard wheel caster would follow the movement of the vehicle to which it is attached. The spindle 32 is mounted behind the kingpin 24 or pivot point about which it rotates during the turning process. The automatic castering mechanism is utilized on both wheel assemblies on the trailer. Further, as shown in FIG. 2, the castering mechanism is utilized on a trailer having a two-point hitch system. This allows for better tracking and control than the standard single-point trailer ball hitch connection.

The trailer 1 is connected to the towing vehicle 4 by means of a double connection pivoting hitch 5. Pivot brackets 220a, 220b are connected to the rear bumper or frame of the vehicle. A trailer tow bar 222 is pivotally connected to the pivot brackets 220a, 220b by means of pivot flanges 224a, 224b, which are held in place within the pivot brackets by means of pivot pins 226a, 26b. The trainer tow bar 222 is connected to the trailer 1 by means of a trailer tongue 228, which extends perpendicularly from the mid-point of the two bar 222 and is fastened within channel 230 on the trailer. Stiffening plate 232 connects the tow bar 22 and trailer tongue 228 to reduce the twisting movement of the tow bar about the tongue. This hitch assembly provides for proper following of the trailer and allows for pivoting of the trailer with respect to the vertical axis to enable the trailer to accommodate pumps or dips in the road. This automatic castering mechanism can also be used, however, on a controlled steering axle, as will be described below.

Figure 13:
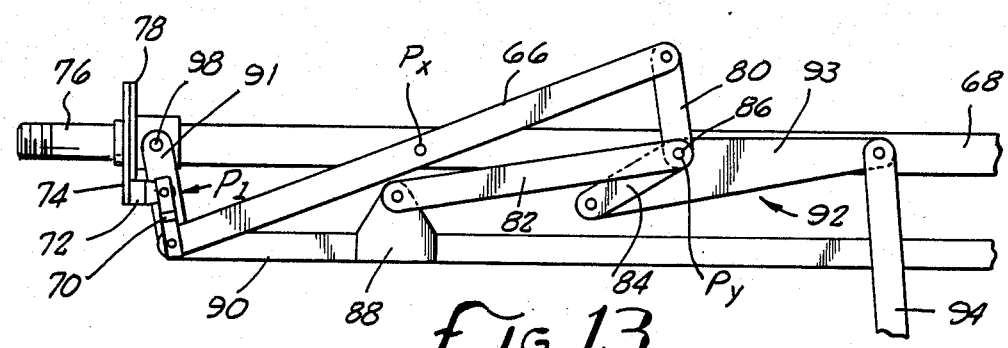
FIG. 13 is a top view showing the steering axle linkage in the neutral position.

In this alternate embodiment, the trailer is equipped with a standard solid axle with a knuckle plate and tie rod steering mechanism. The controlled steering linkage is shown in FIGS. 13–17. A shifting lever 66 is pivotally mounted at its midpoint P$_X$ on the axle 68. One end of the shifting lever 66 is connected to one end of a shifting link 70, and the remaining end of the shifting link, in turn, being connected to a boss 72 which is connected to an actuating plate 74 mounted on the wheel hub 76 adjacent to the knuckle plate 78. The remaining end of the shifting lever 66 is pivotally connected to one end of a first lever 80. The second end of the first lever 80 is pivotally connected to a second lever 82 and third lever 84 by means of a pivot pin 86 as shown in FIG. 13. The remaining end of the second lever 82 is pivotally connected to a tie rod pivot plate 88 mounted on the tie rod 90, also as shown in FIG. 13. The second end of the third lever 84 is pivotally connected an axle pivot plate 92 connected to the axle 68. A steering arm 94 is pivotally connected to the remaining end of the axle pivot plate 92. Tie rod 90 is pivotally connected to axle 68 by means of steering arm 91, which is connected at one end of the tie rod 90 and at its other end to axle 68 by king pin 98.

Figure 14:
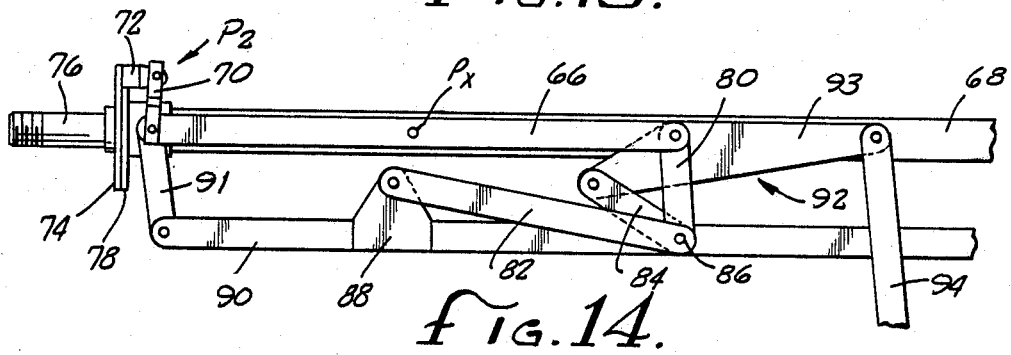
FIG. 14 is a top view showing the steering axle linkage in the active or steering position.
Figure 15:
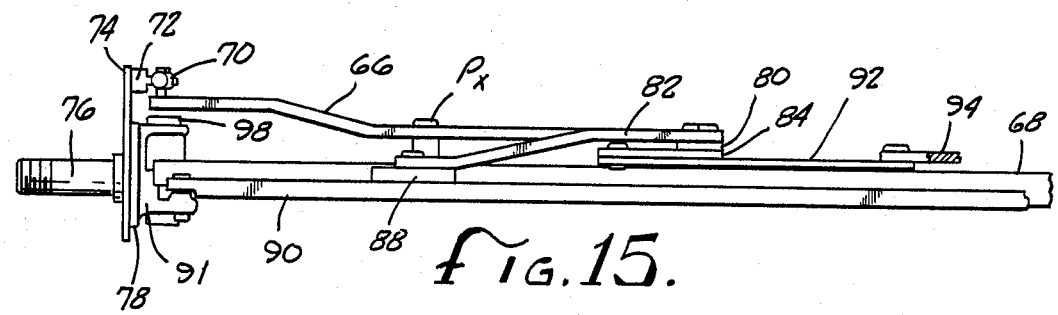
FIG. 15 is a partial front view of the steering axle linkage.

The steering linkage is shifted from an active or engaged position to a passive or disengaged position, and vice-versa by means of the shifting lever 66, which is activated by rotation of the actuating plate 74 about the wheel hub 76, thereby causing the boss to move between positions $P_1$ and $P_2$ as shown in FIGS. 13 and 14. The movement of the boss between positions $P_1$ and $P_2$ causes the shifting arm to pivot about point X, thereby shifting the steering linkage from a passive position to an engaged position and vice-versa.

Figure 23:
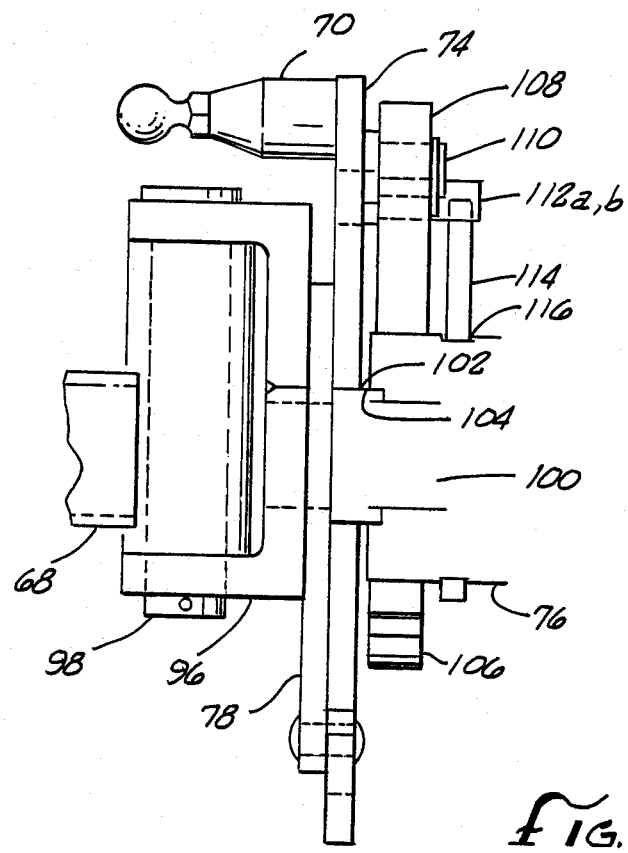
FIG. 23 shows a side view alternate embodiment of the wheel ratchet assembly in FIGS. 9d and 9e.

The components of the hub assembly are shown in FIG. 23. A standard knuckle plate 78 is connected to a pivot bracket 96 which is, in turn, connected to the axle 68 by means of the kingpin 98 as shown in the Figure. The actuating plate 74 is fitted over the spindle 100 and is adjacent to the knuckle plate 78. A retaining ring 102 fits within recess 104 in the spindle 100, holding the actuating plate 74 in place but allowing it freedom to rotate about the spindle 100. The wheel hub 76 is mounted on the spindle 100 and held in place by a standard bolt (not shown). A ratchet ring 106 is mounted on the wheel hub 76 and rotates with said hub. A double-armed ratchet pawl 108 is pivotally mounted on the actuating plate 74 by means of pivot pin 110. Pawl stops 112a and 112b are located on each of the arms of the double-armed ratchet pawl 108. A friction yoke 114 is mounted on the wheel hub 76 as shown in FIG. 23. The friction yoke 114 is mounted within a channel 116 in the wheel hub 76.

Figure 9D:
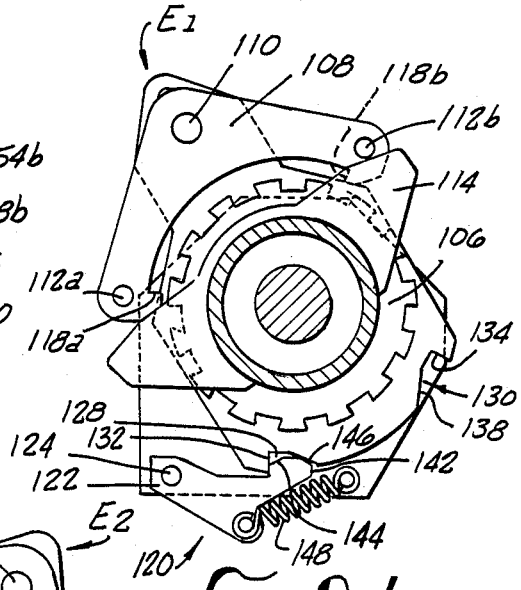
FIG. 9d shows an alternate embodiment of the wheel ratchet assembly in the forward position.
Figure 9E:
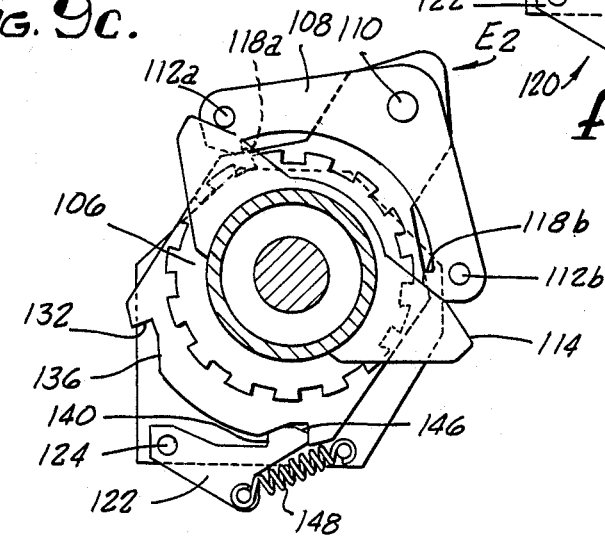
FIG. 9e shows an alternate embodiment of the wheel ratchet assembly in the reverse position.
Figure 10:
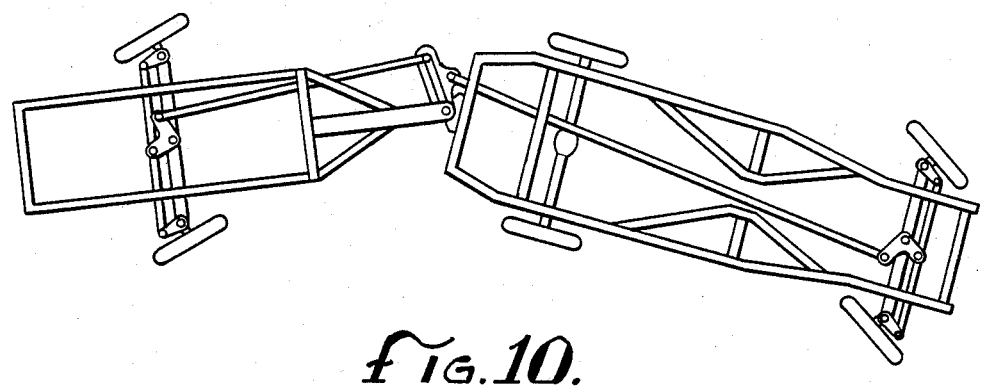
FIG. 10 shows a direct linkage embodiment of the linkage system for the automatic steering axle.

The arrangement of the hub assembly components is also shown in FIGS. 9d and 9e. The configuration and operation of double-armed ratchet pawl 108, ratchet ring 106 and friction yoke 114 are similar to those of double-armed ratchet pawl 42, ratchet ring 38 and friction yoke 46, described above and illustrated in FIGS. 9a, 9b and 9c. During normal rotation of the wheel hub 76, the friction yoke 114 engages one of the pawl stops 112a or 112b, depending upon whether the trailer is moving forward or in reverse, and holds the pawl 108 in a position such that neither of the pawl teeth 118a, 118b engages the ratchet ring 106. Upon stopping of he rotation and commencement of rotation in the opposite direction, the friction yoke 114 rotates away from the pawl stop 112a or 112b, allowing the pawl 108 to pivot about pivot pin 110 such that the pawl tooth 118a or 118b engages the ratchet ring 106. Continued movement or rotation of the wheel hub 76 will cause the ratchet ring 106 to also rotate. The ratchet ring 106 now being engaged with the pawl tooth 118 will cause the actuating plate 74 to rotate about the wheel hub 76 from position E1 to position E2, as shown in FIGS. 9d and 9e.

Rotation of the actuating plate from position $E_1$ to $E_2$ is limited by the spring-loaded stop mechanism 120 shown. A lever 122 is pivotally connected to the knuckle plate 78 by means of pivot pin 124. A locking nub 126 is formed at the opposite end of the lever. The locking nub 126 engages first recess 128 and second recess 130 located in the actuating plate 74. The recesses both have locking shoulders 132 and 134, respectively and disengagement shoulders 136 and 138, respectively. The locking nub 126 has shoulder stops 140 and 142 and disengagement shoulders 144 and 146. As shown in FIG. 9d, when the actuating plate 74 is rotated to the active position, shoulder 132 engages shoulder 140, thereby prohibiting further rotation of the actuating plate 74. When the direction of rotation is reversed, disengagement shoulder 136 of the actuator plate 74 acts against shoulder 146 of the lever 122, forcing the lever 122 to pivot about pivot pin 124, allowing the actuator plate 74 to be rotated about the wheel hub 76. The lever 122 is retained in position by means of spring 148.

When the actuator plate 74 has rotated through to position E2, the lever locking nub 126 engages actuator plate recess 130 and shoulder 142 engages shoulder 134, thereby prohibiting further rotation of the actuator plate. Upon a reversal of the vehicle's direction, the process will be repeated in reverse. The friction yoke 114 will rotate away from pawl stop 112, allowing the tooth 118 to engage the ratchet ring 106, thereby activating the rotation of the actuator plate 74 about the wheel hub 76 from point $E_1$ back to point $E_2$, with the rotation of the actuator plate 74 being limited by the engagement of the lever nub with the actuator plate recess 128.

The shifting action of the actuator plate 74 is best understood by examining the shift of position of the steering linkage in FIGS. 13-17. As shown in FIG. 13, the steering linkage is in a passive position, with the wheel hub assembly being in the position shown in FIG. 9e. In this position, any longitudinal movement of the steering arm 94 will merely cause the axle pivot plate 92 to pivot about point $P_Y$, and will not exert any movement on the tie rod 90. Upon a reverse of direction, the actuator plate 74 will move from position E1 to E2, resulting in the positioning of the steering arm linkage shown in FIG. 14.

During the transition from the passive state in FIG. 13 to the engaged state in FIG. 14, the rotation of the actuator plate 74 and its boss 72 causes the pivoting of the shifting lever 66 about point X, thereby bringing the shifting linkage into the position shown in FIG. 14. In this position, any longitudinal movement of the steering arm 94 will cause the axle pivot plate 92 to pivot about point $P_Y$ which, in turn, will cause the third lever 84 to exert lateral movement on the second lever 82 which, in turn, will cause the tie rod 90 to be moved either left or right.

Figure 16:
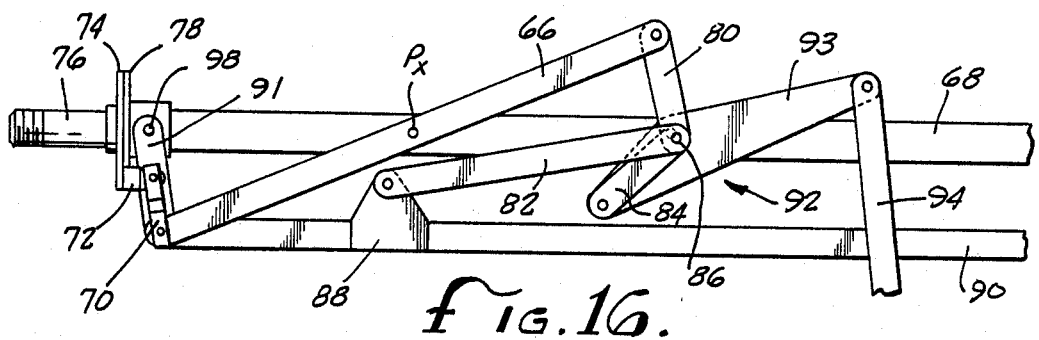
FIG. 16 shows the linkage of FIG. 13 during the turning of the towing vehicle.
Figure 17:
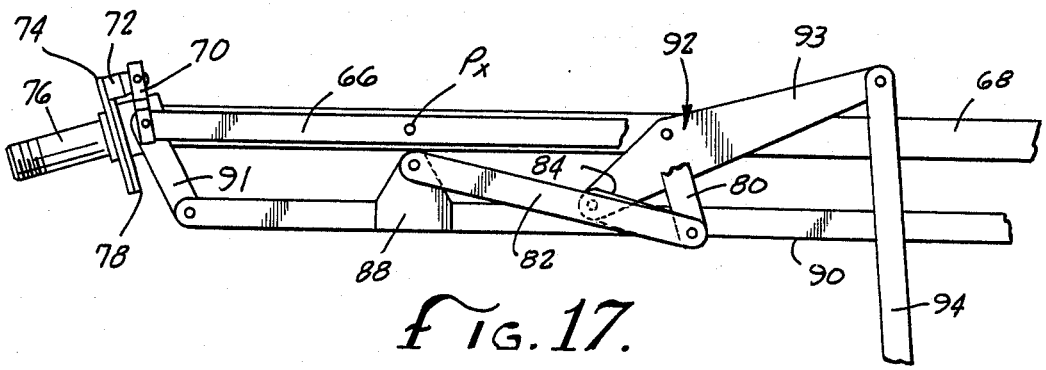
FIG. 17 shows the linkage of FIG. 14 during the turning of the towing vehicle.

The operation of the steering linkage is shown in FIGS. 16 and 17. In FIG. 16, the steering linkage is in the passive position, thus when the steering arm is moved longitudinally backwards from the position shown in FIG. 13, the second lever 82 is caused to pivot about point Y without exerting any lateral force or movement upon the tie rod 90. However, as shown in FIG. 17, when the steering linkage assembly is in the active position upon the longitudinal movement of the steering arm 94, the second lever 82 is caused to move to the right, thereby pulling the tie rod-steering arm assembly to the right, in turn, turning the wheels to the left.

Figure 12:
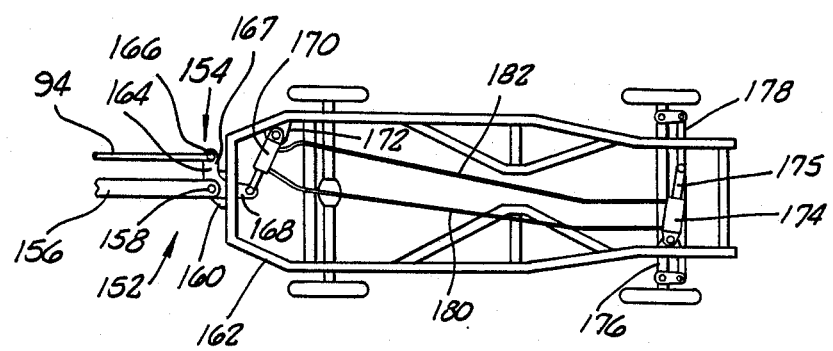
FIG. 12 shows an embodiment of the linkage system for the automatic steering axle utilizing a hydraulic connection.

The trailer is connected to the towing vehicle by means of a standard trailer hitch 152 combined with a bell crank assembly 154, as shown in FIG. 12. The trailer tongue 156 connects to a standard trailer hitch ball 158 mounted on a plate 160 which is welded or otherwise securely fastened to the vehicle frame 162. A bell crank 164 is pivotally mounted on the plate 160 so that it pivots about the trailer hitch ball 158. The trailer steering arm 94 is pivotally connected to a ball 166 on a first arm 167 of the bell crank 164, as shown in FIG. 12. The second arm 168 of the bell crank 164 is connected to one end of a hydraulic cylinder 170. The other end of the hydraulic cylinder 170 is connected to the vehicle frame. As shown in FIG. 12, the hydraulic cylinder is fastened to the frame by means of plate 172.

A second hydraulic cylinder 174 is mounted on the steering axle 176 of the vehicle. One end 175 of the hydraulic cylinder 174 is pivotally connected to the tie rod 178 of the vehicle, with the remaining end of the hydraulic cylinder 174 being mounted on the vehicle frame. The two hydraulic cylinders 170 and 174 are interconnected by means of fluid lines 180 and 182. When the steering axle 176 of the towing Vehicle is turned in either a left or right direction, the hydraulic cylinder 174 is activated accordingly, which causes the rear hydraulic cylinder 170 to be activated, which causes the bell crank 164 to pivot about the trailer hitch ball 158. When the vehicle is moving in a forward direction, the trailer steering linkage is in a neutral position, as described above and illustrated in FIG. 13. The movement of the trailer steering arm 94, which is caused by rotation of the bell crank 164, does not act upon the trailer steering axle.

However, when the trailer is moving in a rearward direction, the steering linkage has been shifted to a position as shown in FIG. 14 and, in this position, the movement of the bell crank 164 caused by the hydraulic cylinder 170 connected to the steering hydraulic cylinder 176 causes a direct action upon the trailer steering linkage, thereby causing the trailer axle to be turned in a left or right direction, depending on the backward motion of the trailer.

In the preferred embodiment, bell crank arm 167 is at least 1½ times the length of the transverse arm 93 of the axle pivot plate 92. This ratio provides for optimal alignment of the trailer wheels and towing vehicle wheels when the towing vehicle and trailer are arranged in a straight line.

Figure 11:
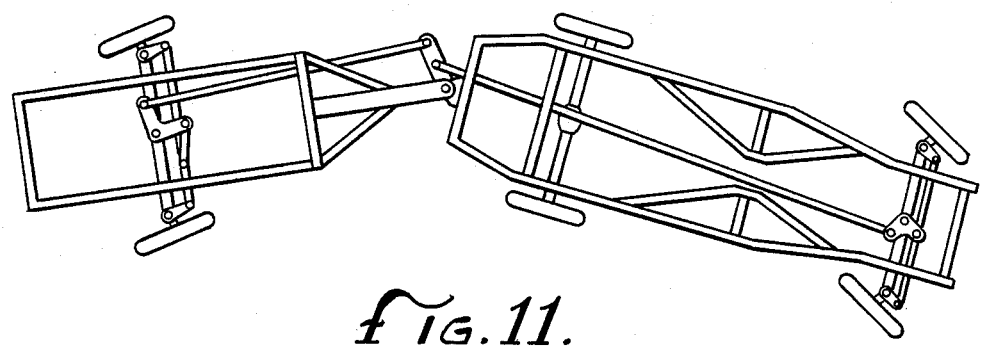
FIG. 11 shows an alternate embodiment of the direct linkage system for the automatic steering axle.

In alternate embodiments, a direct linkage can be connected between the steering axle of the towing vehicle and the trailer hitch assembly. One type of direct linkage is shown in FIG. 11.

Figure 22:
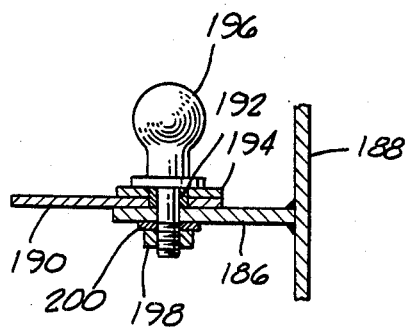
FIG. 22 shows a partial cross-section and side view of the booster arm hitch.

In yet another alternate embodiment, the automatic self-steering axle is controlled and activated by means of a booster mechanism 184, as shown in FIGS. 18-22. In this alternate embodiment, a trailer hitch plate 186 is fastened or welded to the vehicle frame 188. An actuator 190 is journally connected to the plate 186 by means of journal bearing 192 and spacer 194. The trailer ball hitch 196 is inserted through the spacer 194 and actuator 192, as shown in FIG. 22 and held in place by nut 198 threaded onto the end, with spacer 200 helping to lock the nut 198 in place. When the trailer tongue 202 is placed atop the hitch ball 196, a pin is inserted through an aperture in the trailer tongue 202 so as to engage slot 204 in the arm 206 of the actuator. The engagement of the pin with the slot 204 keeps the arm 206 of the actuator 190 aligned with the tongue 202 during rotational movement of the trailer tongue 202.

Figure 20:
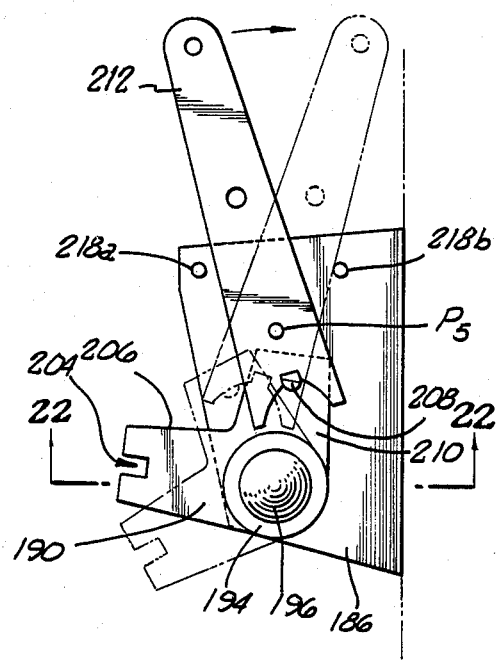
FIG. 20 shows a top view of the booster arm hitch mechanism.
Figure 21:
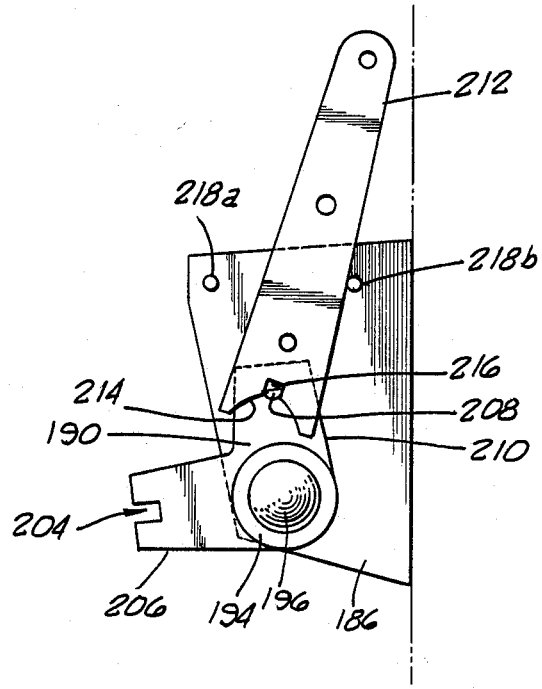
FIG. 21 shows a top view of the booster arm hitch mechanism.

The actuator 190 has the configuration of a 90 degree bell crank as shown in FIGS. 20 and 21. A hemispherical pin 208 extends upward from an intermediate point on the second arm 210 of the actuator 190. A booster arm 212 is pivotally mounted on the hitch plate 186 as shown in FIGS. 20 and 21 such that a cam surface 214 engages pin 208. A rectangular recess 216 is provided in the center point of the cam surface 214. The steering arm of the trailer hitch assembly is pivotally connected to the end of the booster arm 212 as shown in FIGS. 18 and 19. Stops 218a and 218b are located on the hitch plate 186. The stops limit the rotation or movement of the arm booster 212.

The operation of the booster mechanism 184 will now be described. When the towing vehicle moves in a rearward direction and is moved in a turning direction, the movement of the towing vehicle will exert a left or right directional force upon the trailer tongue 202, causing the tongue to pivot about the ball hitch 186. This, in turn, will cause the actuator arm 206 to pivot beneath ball hitch 186, which will have the effect of causing the second actuator arm 210 to act upon the booster arm 212 by means of pin 208. The placement of the pin 208 within the recess 216 is such that the actuator arm 210 will rotate through an angle of approximately 11 degrees, during which the pin 208 will remain in the recess 216. If the actuator is rotated through an angle greater than 11 degrees, as a result of movement of the trailer tongue 202, the pin 208 will exit the recess 216 and move along the cam surface 214, thereby causing a rotation of the booster arm about point $P^5$, which rotation, in turn, acts upon the steering linkage through steering arm 94 to effect the turning of the trailer wheels as shown in FIGS. 18 and 19. The movement of the booster arms 212 is limited by stops 218a and 218b, so that the total amount of movement permitted is a rotation of 45 degrees. In this embodiment, the trailer more closely follows the turning of the towing vehicle and avoids a wide swing-out in the turns.

An alternate actuating mechanism is shown in FIGS. 25-27(d). In this embodiment the trailer hitch assembly 262 again includes a standard hitch and ball assembly 266 mounted on the towing vehicle frame 264. A control plate 268 is rigidly mounted on the hitch and ball assembly 262 and extends outward at a 90 degree angle as shown in FIG. 25(a). A standard ball (not shown) is mounted on the control plate 268.

The trailer is connected to the towing vehicle by connecting the trailer tongue 270 to the hitch and ball assembly 266 and the trailer steering arm link 272 to the control plate ball. The steering arm link 272 in turn is connected to the steering arm 274. The combined steering arm link 272 and steering arm 274 replace the single steering arm 94 depicted in FIGS. 13-17. The steering arm link 272 and steering arm 274 are connected by means of a standard ball joint.

In this embodiment the steering linkage shown in FIGS. 13-17 is modified as shown in FIGS. 27a-d. Steering arm 274 is connected to control bar 276. The control bar 276 in turn operates the steering linkage assembly 278. The steering linkage is connected to the vehicle axle 280 by means of a pivot pin 282 as shown in FIG. 27d. The control bar 276 slides on the top of axle 280 and is positioned between the steering linkage 278 and a roller 283. The roller 282 rotates about pin 284 which is mounted on the axle 280.

An actuation pin 286 is mounted atop control bar 276 and engages pivot lever 288 as shown in FIG. 27b. Recess 290 is located in the control bar 276 opposite activation pin 286. The operation of the actuating mechanism will now be described.

During the backing or reverse movement of the trailer as the towing vehicle (steering vehicle when moving in reverse) turns left or right the trailer hitch assembly 266 pivots with respect to the trailer tongue 270 about the hitch ball. This pivoting causes the control plate 268 to also pivot resulting in the steering arm link 272 to either be pulled forward or pushed backward. This movement is transferred to the steering linkage control bar 276, via the steering arm 274.

Referring to FIGS. 27a-c it can be seen that as the control bar 276 is moved either forward or backward the activation pin 286 which is engaged with pivot lever 288 will cause pivot lever 288 to pivot about pin 282. The pivot lever is rigidly connected at a 90 degree angle to first lever 292. The pivot lever 288 can be a separate element from first lever 292 as shown in FIG. 27d or it can be formed as an integral "L" shaped element. The resulting movement of first lever 252 promotes corresponding movement of second lever 294, third lever 296 and shifting lever 298. Levers 292, 294, 296 and 298 correspond to levers 80, 82, 84 and 66, respectively, shown in FIGS. 13-17.

Third lever 296 is connected at one end to first lever 292 which results in movement of the third lever. The other end of third lever 296 is pivotally connected to guide arm 300. As shown in FIGS. 27a-d, guide arm 300 pivots about pin 282 and is held in a fixed position with respect to pivot lever 288 by means of locking pin 302.

During the turning of the trailer actuating pin 286 is held in contact with pivot lever 288 by roller 283 engagement with recess 250. If the towing vehicle is turned beyond the desired limit the actuation pin 286 will disengage from pivot lever 288 as shown in FIG. 27c. To prevent excessive turning of the trailer, guide arm 300 engages control bar 276 which is held firmly in place against edge 301 by roller 283 which is no longer within recess 250. Since guide arm 300 is now prevented from moving, pivot lever 288 will also be locked against movement. Therefore the trailer cannot be turned past the desired turning radius. Upon a reduction of the turn angle of the towing vehicle the actuation pin 286 will again engage pivot lever 288 and activate the steering linkage.

In those embodiments of the self-steering axle in which the axle actuating means is connected to the towing vehicle's frame and not its steering system it is preferable that the proper ratio between the components be maintained. As explained previously, when connected to the towing vehicle steering system it is desirable that bell crank arm 167 be at least 1½ times the length of the transverse arm 93 of the axle pivot plate 92. In the booster mechanism actuation means or the alternate actuation means it is desirable that the ratio be increased. Since the trailer will always seek a position perpendicular to the crossbar, the increased ratio will reduce the trailer reaction time. Thus booster arm 212 (shown in FIGS. 18, 19) may be up to three times the length of transverse arm 93. Similarly, control plate 268 may be up to three times the length of guide arm 300.

The automatic castering axle and steering linkage assembly described above are shown mounted on a single-axle trailer. It is to be understood that this invention may also be utilized on double-axle trailers. On a double-axle trailer, the steering linkage assembly is mounted on the rear axle to provide trailer steering on what would be the front axle when the trailer is moving in reverse. The second or front trailer axle would be equipped with the automatic castering assembly so that the wheels on this axle more closely follow the turning action of the trailer.

Having thus described these embodiments of the invention, it will be readily apparent and understood to those of ordinary skill in the art that there may be other embodiments which do not depart from the teachings herein. The invention is not to be limited to the above-described embodiments, but is to be accorded the full breadth and scope of the appended claims.

What is claimed:

1. An automatic self-steering vehicle axle comprising:
   a pair of rotation pivoting wheel assemblies, each of said wheel assemblies including a rotation plate;
   a pair of steering arms, each of said steering arms being connected to one of said wheel assembly's rotation plates; and
   a rod member pivotally connecting said steering arms, wherein said wheel assemblies are rotatably connected to the ends of the axle, said wheel assemblies rotation plates being capable of rotation about a vertical axis and, further, wherein each of said wheel assemblies are pivotally connected to said rotation plates, said wheel assemblies capable of pivoting about a horizontal axis wherein said horizontal pivotal axis intersects said vertical rotational axis; and further wherein said wheel assembly includes a ratchet locking means for locking the axial rotation of the wheel assembly.

2. The automatic self-steering vehicle axle of claim 1 wherein each of said wheel assemblies is comprised of a wheel hub rotatably mounted on a spindle which is pivotally mounted on the rotation plate by means of a spindle crank, and further wherein a pair of stop members are mounted on said rotation plate so as to engage said spindle crank.

3. The automatic self-steering vehicle axle of claim 2 wherein the ratchet locking means is comprised of a circular ratchet ring fixedly coupled to the wheel hub, said ratchet ring having a plurality of teeth uniformly arranged about its circumference, and a double-armed ratchet pawl pivotally mounted at its mid-point above the ratchet ring, said pawl pivot point being coaxial with said spindle crank pivot, wherein said double-armed pawl includes a locking tooth at the end of each arm, said locking teeth being coplanar with the ratchet ring.

4. The automatic self-steering vehicle axle of claim 3 wherein the wheel assembly further includes a friction member engaging a stop member located on each arm of the pawl and a double-armed friction member rotatably mounted on said wheel hub, such that during rotation of the wheel hub, said friction member rotating with said wheel hub in the free state; said wheel hub rotating within the friction member upon the friction member's engaging a stop member.

5. An automatic self-steering vehicle axle comprising:
   an axle;
   a tie rod and steering arm assembly connected to said axle;
   a steering linkage assembly connecting said axle and tie rod and steering arm assembly; and automatic activation means for engaging or disengaging said steering linkage assembly.

6. The automatic self-steering vehicle axle of claim 5 wherein the steering linkage assembly is comprised of a first lever pivotally connected to the axle; one end of said first lever being connected to said automatic activation means; a second lever pivotally connected at one end to the free end of said first lever, the remaining end of said second lever being pivotally connected to one end of a third and fourth levers; said third lever being pivotally connected to said tie-rod; said fourth lever being pivotally connected to a pivot plate which is pivotally connected to the axle.

7. The automatic self-steering vehicle axle of claim 5 wherein the automatic activation means is comprised of a plate member and ratchet assembly mounted on the wheel hub, wherein the plate member is mounted over the spindle hub, a ratchet ring being mounted on the wheel hub adjacent to said plate member, a double-armed pawl being pivotally mounted on the plate member coplanar with the ratchet ring.

8. The automatic self-steering vehicle axle of claim 7 wherein the double-armed pawl has a locking tooth located on the end of each arm, said tooth being aligned with the ratchet ring.

9. The automatic self-steering vehicle axle of claim 7 wherein a friction member is rotatably mounted on the wheel hub adjacent to the double-armed pawl, said friction member rotating with said wheel hub when in the free state, but said wheel hub rotating within said friction member when said friction member engages a pawl stop.

10. An automatic self-steering vehicle comprising:
a trailer;
a self-steering axle assembly mounted beneath said trailer; said axle assembly including a pair of rotatable wheel assemblies interconnected by means of a steering arm and tie rod assembly wherein each of said wheel assemblies is rotatable about a vertical axis and is pivotable about a horizontal axis, said vertical and horizontal axis intersecting; and
an automatic ratchet locking means for momentarily locking the wheel assembly against angular rotation about a horizontal axis, thereby promoting the pivoting of the wheel assembly about the horizontal pivot axis;
wherein said trailer includes a two-point connection system for connecting said trailer to a towing vehicle, said connection points being spaced equidistant from the centerline of said trailer.

11. The automatic self-steering vehicle of claim 10 wherein said wheel assemblies are composed of:
a rotation plate rotatably connected to the axle assembly, said rotation plate having a pair of stop members mounted thereon;
a spindle crank pivotally connected to said rotation plate, said spindle crank including a spindle mounted thereon;
a wheel hub rotatably mounted on said spindle;
a ratchet ring fixedly mounted on said wheel hub;
a double-armed pawl member being coplanar with, and pivotally mounted above said ratchet ring, the pawl pivot point being coaxial with the spindle crank pivot point; and
a double-armed friction member mounted on said wheel hub, said friction member rotating with said wheel hub in a free state, said wheel hub rotating within said friction member when said member is in a restrained state.

12. An automatic self-steering vehicle comprising:
a trailer;
an axle mounted beneath said trailer;
a tie-rod and steering arm assembly connected to said axle;
a steering linkage assembly connecting said axle and steering arm assembly; and automatic activation means for engaging or disengaging said steering linkage assembly, wherein said trailer includes a pivotal connection means for connecting the trailer to a towing vehicle and said steering linkage assembly includes a steering arm for connecting the steering linkage assembly to the towing vehicle.

13. The automatic self-steering vehicle axle of claim 12 wherein the steering linkage assembly is comprised of a first lever pivotally connected to the axle; one end of said first lever being connected to said automatic activation means; a second lever pivotally connected at one end to the free end of said first lever, the remaining end of said second lever being pivotally connected to one end of a third and fourth levers; said third lever being pivotally connected to said tie-rod; said fourth lever being pivotally connected to a pivot plate which is pivotally connected to the axle, and said steering arm being connected to the pivot plate.

14. The automatic self-steering vehicle axle of claim 12 wherein the automatic activation means is comprised of a plate member and ratchet assembly mounted on the wheel hub, wherein the plate member is mounted over the wheel hub, a ratchet ring being mounted on the wheel hub adjacent to said plate member, a double-armed pawl being pivotally mounted on the plate member coplanar with the ratchet ring.

15. The automatic self-steering vehicle axle of claim 14 wherein the double-armed pawl has a locking tooth located on the end of each arm, said tooth being aligned with the ratchet ring.

16. The automatic self-steering vehicle axle of claim 14 wherein a friction member is rotatably mounted on the wheel hub adjacent to the double-armed pawl, said friction member rotating with said wheel hub when in the free state, but said wheel hub rotating within said friction member when said friction member engages a pawl stop.

17. The automatic self-steering vehicle axle of claim 12 wherein the trailer is connected to the towing vehicle by means of a booster means comprised of:
a hitch plate connected to the towing vehicle;
a pivot member journally mounted on said hitch plate, said pivot member having a connecting arm and actuating arm;
a booster arm pivotally mounted on said hitch plate, one end of said booster arm being rotatably engaged with the actuating arm of said pivot member, said booster arm including engagement means for connecting said booster arm to the steering arm of the steering linkage assembly.

18. An automatic self-steering vehicle axle comprising:
an axle;
a tie rod and steering arm assembly connected to said axle;
a steering linkage assembly connecting said axle and tie-rod and steering arm assembly;
automatic activation means for engaging or disengaging said steering linkage assembly; and externally connected control means for directly controlling the operation of the steering linkage assembly.

19. The automatic self-steering vehicle axle of claim 18 wherein the steering linkage assembly is comprised of a first lever pivotally connected to the axle; one end of said first lever being connected to said automatic activation means; a second lever pivotally connected at one end to the free end of said first lever, the remaining end of said second lever being pivotally connected to one end of a third and fourth levers; said third lever being pivotally connected to said tie-rod; said fourth lever being pivotally connected to a pivot plate which is pivotally connected to the axle.

20. The automatic self-steering vehicle axle of claim 18 wherein the automatic activation means is comprised of a plate member and ratchet assembly mounted on the wheel hub, wherein the plate member is mounted over the spindle hub, a ratchet ring being mounted on the wheel hub adjacent to said plate member, a double-armed pawl being pivotally mounted on the plate member coplanar with the ratchet ring.

21. The automatic self-steering vehicle axle of claim 20 wherein the double-armed pawl has a locking tooth located on the end of each arm, said tooth being aligned with the ratchet ring.

22. The automatic self-steering vehicle axle of claim 20 wherein a friction member is rotatably mounted on the wheel hub adjacent to the double-armed pawl, said friction member rotating with said wheel hub when in the free state, but said wheel hub rotating within said friction member when said friction member engages a pawl stop.

23. The automatic self-steering vehicle axle of claim 18 wherein the control means is comprised of a direct linkage between the steering linkage assembly and the steering assembly of a towing vehicle.

24. The automatic self-steering vehicle axle of claim 18 wherein the control means is comprised of a pair of interconnected hydraulic cylinders, said first hydraulic cylinder being connected to the towing vehicle steering linkage, said hydraulic cylinder being connected to said steering linkage assembly whereby movement of the first hydraulic cylinder produces a corresponding movement of said hydraulic cylinder.

25. The automatic self-steering vehicle axle of claim 18 wherein the steering linkage assembly is comprised of a first lever pivotally connected at one end to said activation means, a second lever pivotally connected to said tie-rod, a third and fourth levers and a pivot arm, the free end of the first lever, one end of the third and fourth levers and an intermediate point of said pivot arm being pivotally interconnected to the axle, a fifth lever pivotally connecting at one end to said pivot arm and pivotally interconnected of its other end to said second lever and said third lever and a control rod, whereby said fourth lever engages an actuation member on said control rod, wherein said third and fourth levers are in a fixed position relative to one another.

* * * * *